(12) United States Patent
Gooch et al.

(10) Patent No.: US 6,380,281 B1
(45) Date of Patent: Apr. 30, 2002

(54) WATER-BORNE POLYESTER COATINGS BY MINIEMULSION POLYMERIZATION

(75) Inventors: Jan Gooch; John Tsavalas; F. Joseph Shork, all of Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/312,327

(22) Filed: May 14, 1999

Related U.S. Application Data

(63) Continuation-in-part of application No. 08/696,361, filed on Aug. 13, 1996.

(51) Int. Cl.$^7$ .............................. C08F 2/16; C08K 3/26
(52) U.S. Cl. ..................... 523/500; 523/501; 524/458; 524/459; 525/69
(58) Field of Search ................................ 524/458, 459; 523/500, 501; 525/69

(56) References Cited

U.S. PATENT DOCUMENTS

| | | | |
|---|---|---|---|
| 3,620,989 A | | 11/1971 | Cummings |
| 5,071,904 A | | 12/1991 | Martin et al. |
| 5,686,518 A | | 11/1997 | Fontenot et al. |
| 5,721,294 A | * | 2/1998 | Buter et al. |
| 5,786,420 A | * | 7/1998 | Grandhee ...................... 525/7 |
| 5,969,030 A | * | 10/1999 | Grandhee ................... 524/457 |

OTHER PUBLICATIONS

Wang,Schork, Poehlein,Gooch, "Emulsion and Miniemulsion Copolymerization of Acrylic Monomers in the Presence of Alkyd Resins," Journal of Applied Polymer Science, John Wiley & Sons, Inc., p. 2069–2076 (Aug. 18, 1996).

John G. Tsavalas, Jan W. Gooch and F. Joseph Schork, ""Water–Based Crosslinkable Coatings via Miniemulsion Polymerization of Acrylic Monomers in the Presence of Unsaturated Polyester Resin"," Journal of Applied Polymer Science, (Jul. 30, 1999).

\* cited by examiner

*Primary Examiner*—Diana Dudash
*Assistant Examiner*—Mina Haghighation
(74) *Attorney, Agent, or Firm*—Hahn Loeser + Parks LLP

(57) ABSTRACT

A distinctive graft copolymer is made by dissolving an unsaturated polyester resin in various vinyl monomers (methyl methacrylate, styrene, etc.). The monomer/unsaturated polyester solution is then miniemulsion polymerized to form a latex consisting of submicron particles of polymer with the polyester grafted onto the polymer backbone. The latex can be applied to a substrate, which on drying forms a polymeric film with good film properties. The latex can be used in a latex paint formulation in place of an acrylate, acetate or styrene-divinyl benzene latex. In this way it is possible to produce water-borne unsaturated polyester coatings which combine the film hardness properties of an unsaturated polyester coating with easy application and cleanup. The coating will beneficially lack organic solvent exposure of typical polyester coatings.

20 Claims, No Drawings

WATER-BORNE POLYESTER COATINGS BY MINIEMULSION POLYMERIZATION

This application is a continuation in part of Ser. No. 08/696,361 filed Aug. 13, 1996, which claims priority to provisional application 60/002,367 filed Aug. 15, 1995.

TECHNICAL FIELD

The present invention described herein pertains generally to miniemulsion polymerization processes in which an unsaturated polyester resin is dissolved in a vinyl monomer or monomer mixture which is then dispersed under high shear conditions, in the presence of at least one surfactant and optionally, a non-reactive cosurfactant, into an emulsion of submicron droplets. The emulsion is polymerized by a free radical mechanism under conditions which favor nucleation of the monomer droplets. The resultant submicron polymer particles contain polymer with unsaturated polyester resin grafted to the backbone polymer.

BACKGROUND OF THE INVENTION

Water-based coatings, and polymer latexes in particular, have become more widely used in the past several decades because they are environmentally friendly, offer easier clean up, and offer improved performance characteristics. However, in spite of these advantages, solvent based, unsaturated polyesters have remained important for some applications because of superior properties such as gloss, chemical resistance and film formation.

Emulsion polymerization is a widely used technique which has been extensively described in literature, both patent and non-patent. Production of synthetic latexes via emulsion polymerization is well-known. Among the polymers commonly produced by emulsion polymerization are styrene-butadiene copolymers, acrylic polymers and copolymers, and polyvinyl acetate. Polymers prepared by emulsion polymerization are widely used as binders in water-based latex paints for both interior and exterior use. Emulsion polymerization is also used to prepare polymer foams and polymers used as coatings.

Emulsion polymerization requires the following key ingredients: water, a monomer or mixture thereof, a surfactant or mixture thereof, and a polymerization initiator. The monomer or mixture thereof is typically dispersed into droplets and polymer particles are formed during the polymerization with the aid of a surfactant or mixture thereof with the aid of an agitator. Monomer droplet diameters are typically from 1 to 10 microns.

Emulsion and miniemulsion polymerizations have many similarities but the particle nucleation and reagent transplant phenomena are very different. Conventional emulsion polymerization starts with a monomer emulsion comprised of relatively large (in the range of 1 to 10 microns) monomer droplets and significant free or micellar emulsifier. Particle nucleation takes place early in the reaction via homogeneous (water phase) reactions or via free radical entry into monomer-swollen micelles. Radicals can enter the monomer droplets but this phenomenon is generally discounted because of the relatively small droplet surface area. Nucleation stops or slows significantly after the surface area of the particles becomes sufficient to adsorb all of the emulsifier. The major focus of polymerization thereafter is in the nucleated particles. The reagents (monomer, chain transfer agents, etc.) must move from the monomer droplets to the reaction sites in the particles. Transport of large hydrophobic molecules such as unsaturated polyester can be a problem in conventional emulsion polymerization.

Miniemulsion polymerization, by contrast, begins with submicron droplets which are able to accommodate most of the added emulsifier. High intensity fluid deformation and a cosurfactant are employed to generate and stabilize the small droplet size miniemulsion. Particle nucleation is primarily via droplet penetration and, if most droplets are nucleated, the reagents are located at the polymerization sites and mass transport, except for the radicals, is not involved. Either water-soluble or oil-soluble initiators can be employed in miniemulsion polymerization.

Monomer droplet size instability is observed in monomer emulsions. The smaller monomer droplets will disappear by two mechanisms. The first is flocculation into larger droplets. This can be effectively prevented by providing an adequate layer of surfactant at the droplet surface. The second is Ostwald ripening. This phenomenon consists of the diffusion of monomer out of the smaller droplets and into the larger ones; the polymer does not so diffuse. The net effect is a reduction in interfacial surface area, and hence, of surface free energy. In an unpolymerized conventional emulsion (which will be called herein a "macroemulsion"), the disappearance of the small droplets takes place in seconds. This precludes the nucleation of these droplets into polymer particles. In a miniemulsion, a combination of high shear and a cosurfactant are used. The high shear generates very small monomer droplets. The cosurfactant retards Ostwald ripening so that the small droplets can resist diffusional instability. The small droplets can then compete effectively for water-borne free radicals, and the locus of nucleation becomes predominantly the monomer droplets. Common cosurfactants include hexadecane and cetyl alcohol.

U.S. Pat. No. 5,686,518 discloses the use of monomer-soluble polymers as cosurfactants in miniemulsion polymerization, wherein the monomer-soluble polymers are non-reactive with the monomer polymerization and are effective as cosurfactants at a concentration of about 0.5 to about 5.0 percent by weight based on monomer plus polymer. The monomer polymerizations disclosed therein exhibited reaction rates slightly enhanced with increasing concentration of the non-reactive, monomer-soluble polymer cosurfactants.

SUMMARY OF THE INVENTION

In accordance with one aspect of the present invention, there is provided a process for miniemulsion polymerization of a monomer or mixture thereof in the presence of an unsaturated polyester resin, which comprises dissolving one or more unsaturated polyester resins having at least two carbon—carbon double bonds, in an ethylenically unsaturated monomer or mixture thereof, thereby forming a solution, and combining this solution with water and at least one surfactant, and agitating the resulting mixture. The monomer or mixture thereof is substantially insoluble in water and the one or more unsaturated polyester resins are substantially insoluble in water but soluble in the monomer or mixture thereof;

The amount of the one or more unsaturated polyester resins is from about 10 percent to about 120 percent based on monomer weight; thereby obtaining an essentially stable aqueous monomer emulsion comprising an aqueous continuous phase and an organic disperse phase. The disperse phase comprises a monomer or mixture thereof and one or more unsaturated polyester resins, and is in the form of droplets having an average droplet diameter in the range from about 10 to about 1,000 nanometers.

A non-reactive cosurfactant, including, but not limited to, hexadecane, cetyl alcohol, or polymer soluble in said monomer or mixture thereof, may be added to the monomer/unsaturated polyester solution in the amount of 0.5 to 5 percent by weight based on monomer to impart diffusional stability to the emulsion.

The emulsion is subjected to high rates of shear in a sonicator, homogenizer, colloid mill or other device capable of imparting rates of shear great enough to reduce the diameters of the droplets of the disperse phase to the range listed above.

This invention according at a further aspect provides a process which comprises forming an aqueous monomer/unsaturated polyester resin emulsion by combining at least one ethylenically unsaturated monomer with at least one unsaturated polyester resin having at least two carbon—carbon double bonds; agitating the emulsion under high shear to form monomer particles having an average particle size in the range of about 10 to about 1,000 nanometers; and initiating the polymerization by adding a free radical initiator, thereby polymerizing the at least one ethylenically unsaturated monomer in the emulsion and forming a polymer emulsion in which the polymer content is in the form of particles having an average particle size in the range from about 10 to about 1,000 nanometers.

This invention according to a still further aspect provides a latex or polymer emulsion which is the product obtained by polymerizing the monomer emulsion by a free radical mechanism under conditions of miniemulsion polymerization. The polymer content is in the form of particles having an average particle diameter in the range from about 10 to about 1,000 nanometers.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 shows the effect of varying unsaturated polyester resin to monomer solids ratio on the miniemulsion polymerization kinetics;

FIG. 2 shows the effect of varying total solids content on the miniemulsion polymerization kinetics; and FIG. 3 shows electron micrographs of latex particles produced by miniemulsion polymerization.

DETAILED DESCRIPTION OF THE INVENTION

The best mode for carrying out the invention will now be described for the purposes of illustrating the best mode known to the applicant at the time. The example is illustrative only and not meant to limit the invention, as measured by the scope and spirit of the claims.

The term "latex" herein denotes a polymer emulsion. The terms "latex" and "polymer emulsion" will be used interchangeably in this specification. The product of the polymerization process of this invention is a latex.

The term "miniemulsion" herein denotes a monomer emulsion in which the average monomer droplet size is not in excess of about 1,000 nanometers (1 micron). This term is used to distinguish monomer emulsions and emulsion polymerization processes herein from conventional emulsion polymerization processes and starting monomer emulsions. Conventional starting monomer emulsions will be called "macroemulsions" herein.

The term "molecular weight" has its usual meaning to denote grams per gram mole of a substance. As applied to polymers herein, "molecular weight" in the absence of further qualification denotes number average molecular weight unless otherwise stated.

The terms "parts" and "percent" (or %) denote parts by weight and percentage by weight, respectively, unless otherwise stated.

The monomer emulsions of this invention are compositions in which water constitutes the continuous phase and a monomer or mixture thereof containing dissolved unsaturated polyester resin constitutes the disperse phase. Emulsions of this invention are the oil-in-water type. The disperse or organic phase constitutes from about 10 to about 60 percent of total emulsion weight, and conversely the continuous or aqueous phase constitutes about 40 to about 90 percent of total emulsion weight. The disperse phase, consisting essentially of monomer(s) and dissolved unsaturated polyester resin, is present as droplets having an average droplet diameter from about 10 to about 1,000 nanometers, preferably from about 80 to about 500 nanometers.

The monomeric starting material is a monomer or mixture thereof, i.e., one or more primary and optionally one or more secondary monomers. Primary monomers are addition polymerizable ethylenically unsaturated organic compounds which are essentially insoluble in water, i.e., which have water solubilities preferrably ranging from essentially zero to about 15 weight percent, more preferably from essentially zero to about 5 weight percent, and most preferrably from essentially zero to about 3 weight percent. Solubilities are measured in pure water and denote grams of dissolved monomer per 100 grams of water. Representative primary monomers which can be polymerized either alone or in monomer mixtures according to this invention include: methyl methacrylate (MMA), styrene, vinyl acetate, methyl acrylate, butyl acrylate, ethyl acrylate, butadiene and vinyl chloride. This list is representative and is not exhaustive. Secondary monomers are addition polymerizable ethylenically unsaturated organic compounds which are water soluble and are used only in small percentages in a monomer mix and only in the presence of at least one primary monomer. By water soluble, it is meant that the secondary monomer preferrably has a water solubility greater than 85 weight percent, more preferably greater than 90 weight percent, and most preferrably greater than 95 weight percent. The percentage of secondary monomer present in the monomer mix is preferably 0 to 5 percent, more preferably 0 to 3 percent, and most preferably 0 to 1 percent, based on the total monomer weight. Representative secondary monomers are acrylic acid and methacrylic acid. This list is representative and not exhaustive. Use of secondary monomers may impart desired properties to the coatings produced using this invention.

A range of monomer solubilities in water lies between the insoluble and soluble as defined herein, i.e., solubilities of monomer in water of greater than 15 weight percent and up to 85 weight percent. A range of concentration of secondary monomer in the monomer mix of greater than 5 percent also exists. Other combinations of monomer/water solubility and concentration of secondary monomer in primary monomer outside of the preferred ranges may be envisioned by one of ordinary skill in the art; such combinations require that the monomer/water mix form a stable miniemulsion within the scope of this invention.

The unsaturated polyester resins useable in this invention are any of the type typically used in unsaturated polyester coatings formulations, as exemplified by unsaturated polyester Roskydal TPLS 2190 supplied by Bayer. As used in the present invention, the unsaturated polyester has available unsaturation such that at least one of the at least two double bonds per molecule may be available to participate in a free-radical polymerization with the monomer, and at least one of the at least two double bonds may be available to participate in crosslinking.

No added cosurfactant is required in this invention since, under some conditions, the oil-based unsaturated polyester resin itself may act to stabilize the monomer droplets against diffusional degradation, in addition to its function as a reactant in the monomer polymerization. However, in some cases it may be desirable to add a polymeric or non-polymeric, non-reactive cosurfactant. By non-reactive is meant that a polymerized latex resulting from the use of such a nonreactive cosurfactant is essentially free of reaction products of 1) the non-reactive cosurfactant and the monomer, and 2) the non-reactive cosurfactant and the polymer formed during polymerization of the monomer. By essentially free of reaction products, it is meant that, while there may be some reaction between the non-reactive cosurfactant and the monomer or polymer formed during polymerization of the monomer, the concentration of the resulting reaction products is minor compared with the concentration of the reaction products of the unsaturated polyester and the monomer, and of the reaction products of the unsaturated polyester and the polymer formed during polymerization of the monomer. Thus, within the scope of this invention, a non-reactive cosurfactant acts only as a cosurfactant to stabilize the miniemulsion, in contrast with the unsaturated polyester, which may act to stabilize the miniemulsion and also will chemically react with the monomer and/or polymer formed by polymerization of the monomer to impart desired properties to coatings made using this invention.

Polymeric or non-polymeric non-reactive cosurfactants may be used but are not required for the invention. Either a single non-reactive cosurfactant may be used, or a mixture of polymeric, non-polymeric, or polymer and non-polymeric consurfactants may be used. The polymeric non-reactive cosurfactant is a polymer which is both highly water insoluble and highly soluble in the monomer of choice. The polymeric non-reactive cosurfactant may be a polymer (e.g., homopolymer, copolymer, or block or graft copolymer) or a mixture or blend thereof having a molecular weight in the range of about 3,000 to about 1,100,000, preferably from about 9,000 to about 750,000. Especially preferred polymeric non-reactive cosurfactants are those having a molecular weight in the range of about 350,000 to about 750,000. Representative polymeric non-reactive cosurfactants useable in the present invention include polymethyl methacrylate (PMMA), polystyrene, polyvinyl acetate, polymethylacrylate and polyethylacrylate. Generally, the copolymer may be selected from the group consisting of random copolymers, block copolymers, statistical copolymers and graft copolymers. Certain copolymers such as styrene-isoprene copolymer, and certain block polymers such as poly (styrene-block-butadiene) and poly (styrene-block-isoprene) are also useful. Other polymeric non-reactive cosurfactants may be used as long as they meet the above criteria of being essentially insoluble in water but soluble in the monomer or monomer mixture, and are innocuous in the final product. A polymeric non-reactive cosurfactant which is a polymer of the monomer undergoing polymerization is preferred. Thus, polymethyl methacrylate is a preferred non-reactive cosurfactant when methylmethacrylate is the monomer. However, one may choose, as polymeric non-reactive cosurfactant, a polymer which is not the polymer obtained by polymerization of the monomer of choice.

The amount of polymeric non-reactive cosurfactant may be from about 0.5 to about 5.0 percent by weight based on monomer, and the unsaturated polyester and the non-reactive polymeric cosurfactant. Preferably the amount of polymeric non-reactive cosurfactant is from about 0.5 to about 2.0 percent by weight based on monomer, unsaturated polyester, and non-reactive polymeric cosurfactant.

The polymeric non-reactive cosurfactant dissolves in the monomer or monomer mixture to form the disperse (or organic) phase of the monomer emulsion. The resulting solution (the disperse phase) is an essentially homogeneous solution of monomer and polymer.

Nonpolymeric non-reactive cosurfactants may be used in place of polymeric cosurfactants, or in combination with them. Representative nonpolymeric non-reactive cosurfactants include hexadecane and cetyl alcohol. Non-reactive nonpolymeric cosurfactants, when used, are added in a concentration range of from about 0.5 to about 5 percent based on the weight of the monomer.

Conventional surfactants for emulsion polymerization may be used. Either a single surfactant or a mixture of surfactants may be used. Representative surfactants include: sodium lauryl sulfate and other alkyl sulfates; sodium dodecyl benzene sulfonate and other alkyl and aryl sulfonates; sodium stearate and other fatty acid salts; and polyvinyl alcohol and other non-ionic surfactants. The surfactant may be either an anionic, cationic or a non-ionic surfactant. When a mixture or combination of surfactants is used, the mixture may include an anionic or a cationic surfactant, plus a non-ionic surfactant, or two or more anionic or cationic surfactants, or two or more non-ionic surfactants. The amount of surfactant is from about 0.5 to about 5.0 percent by weight, based on monomer plus unsaturated polyester resin. The preferred amount is from about 0.5 to about 1.5 percent by weight, based on monomer plus unsaturated polyester resin.

Use of a non-reactive cosurfactant, including non-reactive, polymeric and nonpolymer cosurfactants, or the unsaturated polyester resin itself, in accordance with this invention results in improved monomer emulsion stability. This is accomplished by a reduction in monomer droplet diameter, which in turn is attributable to the fact that the cosurfactant prevents or reduces the rate of Ostwald ripening. Ostwald ripening is the transfer of monomer from small droplets to large droplets to reduce the total surface energy of the system, resulting in an increase of the average droplet diameter in an emulsion. The other cause of growth in monomer droplet size is coalescence, which is inhibited by the surfactant or mixture thereof. By inhibiting diffusion of monomer from small droplets to large droplets, a cosurfactant slows down the emulsion breakdown process. In a macroemulsion, a monomer emulsion for a conventional emulsion polymerization in which no cosurfactant is used, disappearance of the small monomer droplets takes place in seconds, before nucleation can take place. When a cosurfactant according to this invention is used, Ostwald ripening is retarded so that nucleation of the monomer droplets takes place. In fact, it is possible to completely polymerize a miniemulsion of this invention prior to the onset of significant ripening.

Monomer emulsions according to the present invention are prepared as follows. The desired amount of non-reactive cosurfactant (if used), and the desired amount of unsaturated polyester resin are added to the monomer or mixture thereof, then mixed with gentle agitation (e.g., with a stirring bar) at room temperature until a homogenous solution is obtained. The amount of unsaturated polyester added to the monomer is preferably from about 10 percent to about 120 percent, more preferably about 20 percent to about 110 percent, and most preferably about 30 percent to about 100 percent, based on the weight of the monomer. While the temperature in this step is not critical (in general, any temperature between the freezing point and the boiling point of the monomer can be used), preferred temperatures for monomer miniemulsion formation are from about 20° to about 50° C., more preferentially from about 25° to about 40° C.

The solution prepared in the previous step is added to a previously formed solution of surfactant(s) in water. The entire contents are then subjected to high shear in order to form a miniemulsion. Suitable high shear mixing is obtained, for example, by sonication with a Fisher 300 Watt Sonic dismembrator for 5 minutes at 60 percent output (180 watts) with bulk mixing provided by a stirring bar. (The Fisher 300 Watt Sonic dismembrator is manufactured and distributed by Fisher Scientific Company, Pittsburgh, Pa. Fisher Scientific Company is a subsidiary of Allied-Signal, Inc., Morristown, N.J.) Other high shear mixing equipment, e.g.; a colloid mill or homogenizer can be used if desired. (The sonic dismembrator herein described is suitable for laboratory scale. A colloid mill or homogenizer are suitable for production scale.) In general, any equipment capable of producing localized high shear along with moderate bulk mixing can be used.

While it is preferable to premix the surfactant (or surfactants) and water so as to form an aqueous surfactant solution before adding the solution of polymer in monomer, it is possible to charge the unsaturated polyester resin/ monomer solution, water and surfactant separately to a vessel which is equipped with an agitator or mixer capable of emulsifying the contents.

The above steps result in the formation of an essentially stable monomer emulsion which comprises an aqueous continuous phase comprising water and at least one surfactant dissolved therein, and an organic disperse phase which contains the monomer content and the unsaturated polyester resin content of the emulsion, i.e., an ethylenically unsaturated monomer or mixture thereof and one or more unsaturated polyester resins dissolved therein. A non-reactive cosurfactant may or may not be present. The disperse phase is an essentially homogenous mixture of one or more monomers and one or more unsaturated polyester resins. The disperse phase is in the form of droplets having an average droplet diameter from about 10 nanometers to about 1,000 nanometers, preferably from about 80 to about 300 nanometers.

The aqueous monomer miniemulsion is essentially stable. The emulsion slowly "creams", i.e., the disperse phase slowly rises to the top so that a visible phase separation line appears. However, the shelf life of a miniemulsion of this invention will vary depending on the amount of surfactant and the amount of non-reactive cosurfactant (if any) used. In any case, the shelf life is sufficiently long so that the monomer content of the emulsion can be polymerized in less time than the time required for phase separation or "creaming". (The term "creaming" and variants thereof such as "cream" and "creams" refer to phase separation which takes place in unhomogenized milk, wherein butterfat globules slowly rise to the top of the container. Creaming in milk is readily observable when the milk with a cream is contained in a glass bottle or other transparent container.)

The monomer content of the monomer emulsion is polymerized under free radical polymerization conditions in the presence of a free radical initiator. Both the initiator and the conditions may be conventional. Free radical polymerization conditions are generally obtained by adding a free radical initiator and allowing polymerization to take place. Suitable free radical initiators are known in the art. These include, for example, the organic peroxides such as benzoyl peroxide, lauroyl peroxide and dicumyl peroxide; and inorganic persulfates such as potassium persulfate or ammonium persulfate; azobis-(isobutyro nitrile) (AIBN); and redox pairs such as $Fe^{2+}/H_2O_2$; $ROH/Ce^{4+}$ (where R is an organic group such as C1–C6 alkyl or C5–C8 aryl) and $K_2S_2O_8/Fe^{2+}$. The initiators used in the present invention in general are known in the art. Basically, any free radical generating system which is effective at the polymerization temperature can be used. The type of initiator is not critical to this invention. The polymerization initiator may be either a water soluble or an oil soluble compound.

Polymerization may be carried out over a broad temperature range, e.g., from about 20° to about 90° C. The preferred polymerization temperature depends on the choice of initiator. A preferred polymerization temperature range is from about 25° to about 80° C. The polymer particle size in the product polymer emulsion or latex is in the range of about 10 to about 1,000 nanometers, which is the same range as that of the monomer droplets in the monomer emulsion. There is no substantial change in particle size during polymerization in most cases. Usually the product polymer particle size will be in the range from about 10 to about 1,000 nanometers. The preferred product polymer particle size range is from about 80 to about 300 nanometers.

Polymer latexes produced according to the present invention can be used to formulate water-borne coatings such as latex paint. The coatings will have the environmental (lack of volatile organic emissions) and convenience (water cleanup) advantages of latex coatings, but with the hardness and durability properties of unsaturated polyester coatings which are normally applied from a solvent vehicle.

This invention will now be described in further detail with reference to the example which follows.

In the following example, the word "emulsion" is taken to mean emulsions (with or without polymer or nonpolymer, non-reactive cosurfactant) which have been created and evaluated for stability. The word "latex" is used to connote emulsions in which the monomer has been polymerized to form polymeric latexes. The "polydispersity" of the droplet or particle size distribution will be defined as the ratio of the number average diameter to weight average diameter.

EXAMPLE #1

Bayer Chemicals supplied the unsaturated polyester resin, Roskydal© TPLS 2190. Monomers used were obtained from Aldrich and included methyl methacrylate (MMA), butyl acrylate (BA), and acrylic acid (AA). Monomers were first distilled to remove any inhibitors present. The surfactant and initiator used were sodium dodecyl sulfate (SDS) and potassium persulfate (KFS), respectively, both supplied from Aldrich. Hydroxyethylcellulose, a thickener used in film formation, was also from Aldrich. Hydroquinone, for quenching, was supplied by Fisher and the water used throughout the work was deionized.

The recipe for polymerization is shown in Table I. Emulsions were prepared by dispersing the monomer and resin mixture into a SDS-water solution by magnetic stirring. The monomer and resin mixture was first prepared by stirring the monomers (MMA, BA, and AA) and then dissolving the resin into the solution. Prior to sonication, the emulsion was subjected to mechanical shear by fast magnetic stirring for duration of 30 minutes. To prepare the miniemulsion droplet size, the emulsion was then sonicated with a Fisher 300 W sonic dismembrator for 30 minutes at 70% output (210 W).

TABLE 1

Hybrid Miniemulsion Polymerization General Recipe

| Ingredients | Recipe Distribution[a] |
| --- | --- |
| Methyl Methacrylate | 49% total monomer weight[b] |
| Butyl Acrylate | 50% total monomer weight |
| Acrylic Acid | 1% total monomer weight |
| Sodium Lauryl Sulfate | 0.02 moles/L H2O |
| Potassium Persulfate | 0.02 moles/L H2O |
| Roskydal TPLS 2190 resin | 1:3, 2:3, 1:1 (wt. Resin:wt.Monomer) |

[a]Total emulsion weight 500 grams. DI water as continuous phase.
[b]Monomer + Resin weight varied from 25% to 45%.

The miniemulsion was then transferred to a 1000-mL four-neck baffled glass reactor. The reactor was equipped with a condenser, thermometer, mechanical impeller stirrer, and a nitrogen inlet-outlet. Prior to charging the reactor, the system was subjected to a nitrogen purge for 10–15 minutes. Following the purge, the reactor was charged with the miniemulsion and allowed another 10–15 minutes to heat to the reaction temperature. During this time the droplet size was measured to ensure miniemulsion size range and to check that Ostwald ripening was not occurring detrimentally. Polymerization was initiated by injecting an aqueous potassium persulfate solution. A half-moon paddle stirrer at around 250–300 rpm provided agitation. Reaction conversion kinetics were followed gravimetrically by sampling the reactor every 5–10 minutes and quenching the samples with a 1% (wt:wt) aqueous hydroquinone solution. Dry solids analysis was performed by drying known sample weight in an oven at 70° C. overnight. Conversion was based upon solid content after drying.

Dynamic light scattering with a Malvern IIc Autosizer was used to measure both droplet and latex particle diameters. Samples for monomer droplet size measurements were prepared by diluting a miniemulsion sample by adding 2 drops to a 25 g 0.003M SDS solution saturated with MMA. About 2 mL of this solution was placed in a quartz cuvette to be inserted into the Malvern instrument. Samples for latex particle size were prepared by diluting around 100:1 (vol:vol) in deionized water. After dilution, the latex samples were subjected to an oven environment for around 1 hr to evaporate any unreacted monomer.

Shelf life stability was measured by placing around 30 mL of miniemulsion in a capped glass vial and measuring the time needed for a cream line to appear. In some cases, a red dye was also added to help distinguish the cream line.

Shear stability samples were prepared in much the same fashion. Vials were filled, 3–5 boiling chips were added, and the vials were capped and shaken vigorously for around 5–10 minutes. Observation was made in reference to any coagulation or separation.

Freeze/thaw stability was measured by subjecting samples to cycles of a frozen environment followed by an ambient one. Capped vials containing samples were put in a freezer at −5° C. for 12 hours and then put on the shelf for the same time. This cycle was then repeated until coagulation or separation occurred.

Particle morphology was measured by transmission electron microscopy (TEM). Samples were prepared by first diluting the latex in deionized water in similar manner to light scattering preparation. Three drops of a 1% osmium tetroxide aqueous solution were then added to stain the latex. Osmium tetroxide complexes with double bonds only present in the polyester resin, thus providing contrast between the acrylic-rich and polyester-rich portions of a particle in a micrograph. The stain was allowed to react for 24 hours in the diluted latex before application of one drop of the latex to a 200-mesh nickel TEM grid. The drop was allowed to dry overnight, evaporating the water and letting the polymer deposit onto the grid. The instrument used was a 150 kV Hitachi HF-2000 FE-TEM.

A Bruker AMX 400 spectrometer was used for $^{13}$C NMR results. Preparation of samples involved only dissolving the sample into dueterated chloroform ($CDCl_3$). A delay time of 3 seconds, a pulse length of 90° and 1000 scans were used. The data was acquired quantitatively using inverse gated decoupling with a long relaxation time while not irradiating during that relaxation.

Solid State NMR was run in a Bruker X 300, CP MAS $^{13}$C spectrum using spinning side band suppression by TOSS. Solid samples were first dried in a vacuum oven overnight and then ground Into a powder in a mortar/pestle setup. Ground samples were then tightly packed (100 mg) into a ceramic pan with cap designed for the high spin pressure of solid state NMR.

Films were prepared on cleaned flint glass sheets of dimension 4"×8". The latex was first prepared for film drawing by mixing with 5 wt % hydroxyethylcellulose thickener, generally at 1 part thickener to 20 parts latex. The prepared latex solutions were cast as a film onto the glass with a Baker Coater draw-down.

Ambient formed films were prepared in two ways. The first involved the addition of the thickener, casting onto the glass substrate, and shelving for 24+hours. The second involved adding a small concentration of an organometallic drying agent (mixture of $Ca^{2+}$, $Co^{2+}$, $Mg^{2+}$, and $Cr^{2+}$ metals at 6% of total drying agent weight and napthenate or octoate as organic). The incorporation of this drying catalyst not only improves the drying efficiency, it also increases the degree of hardness achieved by films. A heated cure can be employed if room temperature is below the minimum film forming temperature for a specific emulsion system. This process only deviates from the ambient cure in that the prepared films are placed in an oven until full curing is achieved.

Film properties measured were hardness, adhesion, and homogeneity. Homogeneity is observed in the degree of transparency, pencil hardness by ASTM D 3363-74 and adhesion by ASTM D 3359-78.

In order to study how compatible the unsaturated polyester resin component was with our miniemulsion system, a series of experiments were performed varying the ratio of resin weight to total monomer weight. FIG. 1 shows the total monomer conversion as a function of time for a standard mirnemulsion recipe varying the ratio of Roskydal© TPLS 2190 resin to monomer. The monomer mixture in these runs was a blend of methyl methacrylate, butyl acrylate, and acrylic acid in the ratio 49:50:1 by weight. Both the initiator and surfactant concentrations were 0.02 moles per liter aqueous phase in each run and the reaction temperature was 75° C. In FIG. 1, it is shown that as the resin to monomer ratio was increased, the reaction rate decreased.

FIG. 2 shows conversion profiles for the Roskydal© TPLS 2190 polyester resin and MMA/BAIAA acrylic polymerization system for several levels of total emulsion solids. The monomer ratio was held constant at weight fractions of 49:50:1 of MMA, BA. and M respectively. Again, both the initiator and surfactant concentration were at 0.02 moles per liter aqueous phase. The ratio of monomer to resin was held constant at 1:1. FIG. 2 shows that successful polymerizations were achieved even when percent total emulsion solids were increased to near 50%.

Miniemulsions are constricted to submicron droplet diameters as compared to macroemulsion micron sized monomer droplets. Since nucleation is in the droplets themselves, the droplet and latex particle diameters should not differ, within statistical levels of uncertainty. Table 2 shows dynamic light scattering data of the monomer droplet and latex particle diameters. Comparing the droplet diameter to the particle diameter, only very small differences are observed. This lack of diameter change is evidence of droplet nucleation.

TABLE 2

Droplet and Particle Diameters as Measured by Dynamic Light Scattering

| Run Label | Droplet, Particle Size (nm) |
| --- | --- |
| TPLS35/17.5-1 | 175, 162 |
| TPLS35/17.5-2 | 159, 158 |
| TPLS35/17.5-3 | 194, 183 |
| TPLS35/17.5-4 | 142, 151 |

TABLE 2-continued

Droplet and Particle Diameters as Measured by Dynamic Light Scattering

| Run Label | Droplet, Particle Size (nm) |
| --- | --- |
| TPLS35/17.5-6 | 158, 142 |
| TPLS25/12.5-1 | 181, 146 |
| ACRYLIC ONLY | 155, 166 |
| TYPICAL MACRO EMULSION | ~1 micron, ~200 nm |

Table 3 shows that the monomer droplet size, without added non-reactive cosurfactant, did not increase during the 10 minutes time that followed sonication to the initiation of polymerization. Thus, the unsaturated polyester may stabilize the polymer droplets. This is significant because the unsaturated polyester resin is included in the final polymer product, providing some of the properties of the product, and is in no way considered VOC.

TABLE 3

Run TPLS 35/17.5-1.35% Total Emulsion Solids, Half of Which Is Composed of Resin Weight

| Monomer Droplet Measurement | Malvern % Merit | (nm) Number Average | (nm) Z Average | St. Dev. |
| --- | --- | --- | --- | --- |
| Before initiation | 6.4 | 187.9 | 182.2 | 46.7 |
| After initiation | 61.3 | 161.8 | 180.8 | 30.4 |

Varying resin solids was not found to noticeably influence the emulsion shelf stability in a detrimental manner. All polymerized latex samples prepared by hybrid miniemulsion polymerization in the presence of polyester Roskydal© TPLS 2190 were shelf stable. Polymerized latex stability is mainly a function of particle size and polymer density, so these properties were suitable to arrest the latex from creaming in shelf tests as all samples were found shelf stable. Table 4 shows results of shelf life along with shear and freeze/thaw stability test results. All hybrid miniemulsions were shear stable, yet no system lasted more than two freeze/thaw cycles.

TABLE 4

Stability Results

| Run Label | Type of Experiment | Emulsion Shelf Stability Duration | Shear Stable | Max # Freeze/Thaw Cycles W/O Coagulation |
| --- | --- | --- | --- | --- |
| TPLS35/17.5-1 | original system | >5 months | yes | 2 |
| TPL835/17.5-2 | higher % BA | >5 months | yes | 2 |
| TPLS35/17.5-3 | MA substitute for AA | >5 months | yes | 2 |
| TPLS35/17.5-4 | AA increase to 4% | >5 months | yes | 2 |
| TPLS35/17.5-6 | Higher % BA | >5 months | yes | 2 |
| TPLS35/12.5-1 | low solids | >5 months | yes | 2 |
| TPLS35/18-1 | high solids | >5 months | yes | 1 |
| ACRYLIC ONLY MINIEMULSION | no resin | 1–3 months | yes | 1 |
| TYPICAL MACROEMULSION | no sonication | <12 hours | no | — |

Particle morphology was determined by electron microscopy. Since the resin is preferentially stained by osmium tetroxide, it is possible to observe resin-rich and acrylic-rich portions of a hybrid latex particle. FIG. 3 shows two TEM micrographs of latex particle systems. The micrograph on the left is of a purely acrylic system prepared by miniemulsion polymerization. No polyester resin is present, thus making a basis morphology to compare to the hybrid system. The micrograph on the right is of a hybrid latex prepared from a weight ratio of roughly 1:1 resin to acrylic monomer. The resin-rich phase is seen as the dark black shade in the particles and the acrylic-rich phase the same shade as in the left micrograph of the pure polyacrylic system.

FIG. 3 shows that the resin was incorporated into the final polymer particles. Percent crosslinking during the polymerization was established by solvent extraction. A series of good polymer solvents were selected and the polymer was sequentially extracted with each solvent. Crosslinked material did not dissolve, so the mass remaining after extraction was heavily crosslinked. The polyester/acrylic exhibited crosslinking of over 72%, as seen in Table 5.

TABLE 5

Crosslinking Results
Percent crosslinking based on total emulsion solids

| System | Total Extraction Time, hrs | % Crosslinking |
| --- | --- | --- |
| TPLS 35/17.5-1 | 96 | 76.3 |
| TPLS 35/17.5-6 | 96 | 71.9 |
| TPLS 40/18-1 | 96 | 76.5 |

Solid state NMR was used to investigate the existence of residual double bonds in the polymerized latex. Here residual double bonds are defined as those olefinic sites still unused after grafting and crosslinking during polymerization. These bonds are then available for crosslinking during film curing. The integrated areas of the olefinic peaks at 120–140 ppm were used to quantify the residual double bonds. Table 6 shows that nearly 10% of the original double bonds were left after polymerization and are available to cure the polymer in film formation.

TABLE 6

Usage of polyester resin double bonds during polymerization

| | TPLS35/17.5-1 | TPLS35/17.5-6 |
| --- | --- | --- |
| % double bonds converted | 90.48 | 87.07 |
| % residual double bonds | 9.52 | 12.93 |
| % total mass crosslinked during polymerization | 76.30 | 71.90 |

The adhesion of films cast from acrylic/polyester latexes attained the highest classification of 5 and pencil hardness gave reasonable values of 2 H without the aid of a drying catalyst. The hardness improved to 3 H with addition of organometallic drying catalyst, 0.5 wt % of the resin recipe weight, added to the latex emulsion before drawing the film.

In order to obtain successful films, several requirements were found. The most important of these was that no heat should be added. In all cases, added heat during drying would crack and break up the film. The film thickness should also be constricted to 1–3 mils; anything over 3 mils would lead to cracks in the film. Cracking in thick films would even occur when no heat was added. Finally, a concentration of hydroxyethylcellulose thickener of at least 5 wt % of the latex emulsion is needed for film homogeneity. Exceptional hardness, adhesion and homogeneity were obtained when those requirements were met.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. While this invention has been described in detail with reference to preferred embodiments, it shall be understood that such description is by way of illustration and not by way of limitation.

What is claimed is:

1. A process for preparing an aqueous monomer/unsaturated polyester emulsion which comprises:
    mixing at least one unsaturated polyester resin having at least two carbon—carbon double bonds in at least one ethylenically unsaturated monomer or mixture thereof, thereby forming an unsaturated polyester-resin-in-monomer solution, and
    combining the unsaturated polyester-resin-in-monomer solution
        with water, and
        at least one surfactant, and
        agitating the resulting mixture under high shear;
    thereby obtaining an aqueous monomer emulsion comprising:
        an aqueous continuous phase; and
        an organic disperse phase;
    the organic disperse phase comprising:
        said at least one ethylenically unsaturated monomer or mixture thereof and said at least one unsaturated polyester resin; and
        said organic disperse phase being in the form of droplets having an average droplet diameter range from about 10 to about 1,000 nanometers;
    wherein said unsaturated polyester-resin-in-monomer solution comprises:
        about 10 percent to about 120 percent of unsaturated polyester resin based on the weight of the at least one ethylenically unsaturated monomer.

2. The process of claim 1 wherein the step of mixing the at least one unsaturated polyester resin with at least one ethylenically unsaturated monomer or mixture thereof further comprises adding at least one non-reactive cosurfactant.

3. The process of claim 2 wherein the non-reactive cosurfactant is a polymeric non-reactive cosurfactant selected from the group consisting of homopolymers, random copolymers, block copolymers, statistical copolymers and graft copolymers.

4. The process of claim 3 wherein the amount of polymeric non-reactive cosurfactant is from about 0.5 to 5.0 percent by weight based on the amount of the at least one ethylenically unsaturated monomer and the unsaturated polyester resin and polymeric non-reactive cosurfactant added.

5. The process of claim 1 in which the amount of said one or more unsaturated polyester resins is from about 20 percent to about 110 percent by weight based on the amount of the at least one ethylenically unsaturated monomer.

6. The process of claim 1 in which the amount of said one or more unsaturated polyester resins is from about 30 percent to about 100 percent by weight based on the amount of the at least one ethylenically unsaturated monomer.

7. The process of claim 1 wherein the at least one ethylenically unsaturated monomer or mixture thereof comprises at least one primary monomer having a water solubility of from 0 to about 5 weight percent, and optionally at least one secondary monomer having a water solubility greater than 95 weight percent.

8. The process of claim 7 wherein the at least one primary monomer has a water solubility of from 0 to about 3 weight percent.

9. The process of claim 1, wherein the at least one ethylenically unsaturated monomer or mixture comprises: at least one primary monomer selected from the group consisting of styrene, vinyl acetate, C1 through C4 inclusive alkyl acrylate, C1 through C4 inclusive alkyl methacrylate, butadiene and vinyl chloride; and optionally at least one secondary monomer selected from the group consisting of acrylic acid and methacrylic acid; wherein the concentration of the at least one secondary monomer is from 0 to 3 percent, based on the total monomer weight.

10. A process according to claim 1 in which the weight of said organic disperse phase is from about 10 percent to about 60 weight percent based on total emulsion weight.

11. A process according to claim 1 wherein the temperature of the process is from about 20 to about 50° C.

12. The process of claim 1 which further comprises adding a free radical initiator after the step of agitating the mixture under high shear.

13. The process of claim 2 wherein the non-reactive cosurfactant is a nonpolymeric non-reactive cosurfactant selected from the group consisting of hexadecane and cetyl alcohol.

14. The process of claim 13 wherein the concentration of the non-reactive cosurfactant is from about 0.5 to about 5 percent based on the weight of the at least one ethylenically unsaturated monomer.

15. A process which comprises:

forming an aqueous monomerlunsaturated polyester resin emulsion by combining at least one ethylenically unsaturated monomer with at least one unsaturated polyester resin having at least two carbon—carbon double bonds;

agitating the emulsion under high shear to form monomer particles having an average particle size in the range of about 10 to about 1,000 nanometers; and initiating the polymerization by adding a free radical initiator, thereby polymerizing the at least one ethylenically unsaturated monomer in the emulsion and forming a polymer emulsion in which the polymer content is in the form of particles having an average particle size in the range from about 10 to about 1,000 nanometers.

16. A graft copolymer latex which comprises:

a polymer of at least one ethylenically unsaturated monomer; and at least one unsaturated polyester resin onto at least part of which is grafted at least part of the polymer of the at least one ethylenically unsaturated monomer; thereby forming a graft copolymer;

the graft copolymer latex having an average particle diameter from about 10 to about 1,000 nanometers; and the graft copolymer having a number average molecular weight of from about 40,000 to about 90,000;

wherein the amount of unsaturated polyester resin is from about 10 to about 120 percent by weight based on the weight of the at least one ethylenically unsaturated monomer.

17. The latex of claim 16, wherein the at least one ethylenically unsaturated monomer or mixture comprises: at least one primary monomer selected from the group consisting of styrene, vinyl acetate, C1 through C4 inclusive alkyl acrylate, C1 through C4 inclusive alkyl methacrylate, butadiene and vinyl chloride; and optionally at least one secondary monomer selected from the group consisting of acrylic acid and methacrylic acid; wherein the concentration of the at least one secondary monomer is from 0 to 3 percent, based on the total monomer weight.

18. The process of claim 1 wherein said droplets have an average droplet diameter of about 80 to about 500 nanometers.

19. The process of claim 9, wherein the concentration of the at least one secondary monomer is from 0 to 1 percent, based on the total monomer weight.

20. The latex of claim 17, wherein the concentration of the at least one secondary monomer is from 0 to 1 percent, based on the total monomer weight.

* * * * *